United States Patent [19]

Kizaki

[11] Patent Number: 4,686,702
[45] Date of Patent: Aug. 11, 1987

[54] SIGNAL TRANSMISSION CONTROL APPARATUS

[75] Inventor: Yoshio Kizaki, Tokyo, Japan

[73] Assignee: Clarion Co., Ltd., Tokyo, Japan

[21] Appl. No.: 770,728

[22] Filed: Aug. 29, 1985

[30] Foreign Application Priority Data

Aug. 31, 1984 [JP] Japan .............................. 59-182028

[51] Int. Cl.$^4$ ........................................ H04M 3/02
[52] U.S. Cl. .................................. 379/373; 379/350
[58] Field of Search ............ 179/170 R, 81 R, 16 AA, 179/16 A, 18 FA, 84 R, 2 R, 2 A, 18 HA, 18 HB, 18 H, 84 R; 379/373, 372, 350, 343, 377, 378, 387

[56] References Cited

U.S. PATENT DOCUMENTS

| | | | |
|---|---|---|---|
| 4,027,109 | 5/1977 | Smith et al. | 379/287 |
| 4,199,664 | 4/1980 | Grangé et al. | 379/382 |
| 4,232,293 | 11/1980 | Harris | 340/147 R |
| 4,500,754 | 2/1985 | Mackey | 379/398 |
| 4,523,056 | 6/1985 | Fisher | 379/368 |

*Primary Examiner*—Gene Z. Rubinson
*Assistant Examiner*—R. Vaas
*Attorney, Agent, or Firm*—Russell E. Hattis; Stephen R. Arnold

[57] ABSTRACT

A signal transmission control apparatus connected between a telephone line and a terminal device controls signal transmission therebetween in no-ringing service. First DC and AC circuits of the apparatus become conductive in response to a DC control voltage from the telephone line. The first DC and AC circuits are connected to the telephone lines and the leads of a primary coil of the transformer of the apparatus. The secondary coil of the transformer is connected to the terminal device and an amplifier and first detection device of the apparatus. A subsequent AC calling signal from the telephone line, received on the first AC circuit, effects conduction in second DC and AC circuits through serial operation of the first detection circuit, a control circuit, a switching transistor and closure of relay contacts. The second DC and AC circuits are of lower resistance and impedance, respectively, than the first DC and AC circuits, respectively to indicate operation of the apparatus to the telephone line and minimally to affect signal transmission of AC information through the transformer primary and secondary coils.

9 Claims, 2 Drawing Figures

SIGNAL TRANSMISSION CONTROL APPARATUS

BACKGROUND OF THE INVENTION

1. Field of the Invention

This invention relates to a signal transmission control apparatus applied to telephone service, and in particular to no-ringing service, by which signal transmission is effected without ringing the usual telephone apparatus.

2. Description of the Prior Art

In no-ringing service, an exclusive device acting as a signal transmission control apparatus is connected (set) to a telephone line in parallel with respect to a usual telephone apparatus in each house. A signal transmission line is formed between the telephone line and a terminal device, by the fact that only the exclusive device is called separately through the telephone line by adding a calling signal, to which the usual telephone apparatus does not react and which makes only the exclusive device work.

This no ringing service is now available also in Japan. However, the protocol therefor (communication procedure or communication regulation) is different for every country and it has not yet been standardized.

OBJECT OF THE INVENTION

The object of this invention is to provide a new signal transmission control apparatus, which can be applied to a proposed protocol as an example.

This object can be achieved with a signal transmission control apparatus connected between a telephone line and a terminal device for controlling mutual signal transmission therebetween, comprising:

a transformer, whose primary and secondary coils are connected with said telephone line and the terminal device, respectively;

a first signal detecting circuit connected with the secondary coil of said transformer;

first DC and AC circuits, which are formed depending on a control voltage from the telephone line so that the primary coil of said transformer and said telephone line are connected;

second DC and AC circuits, which are connected to the primary coil of said transformer and formed depending on a calling signal from said telephone line;

a relay connecting said second DC and AC circuits with said telephone line;

a switching circuit, which turns said relay on and off;

a photocoupler, which is connected with said second DC circuit; and a control means, which is connected to said photocoupler and controls said switching circuit depending on a detection signal from said first signal detecting circuit.

Hereinbelow this invention will be explained, referring to the accompanied drawing illustrating preferred embodiments of this invention, in which:

DESCRIPTION OF THE EMBODIMENT

Figure 1:
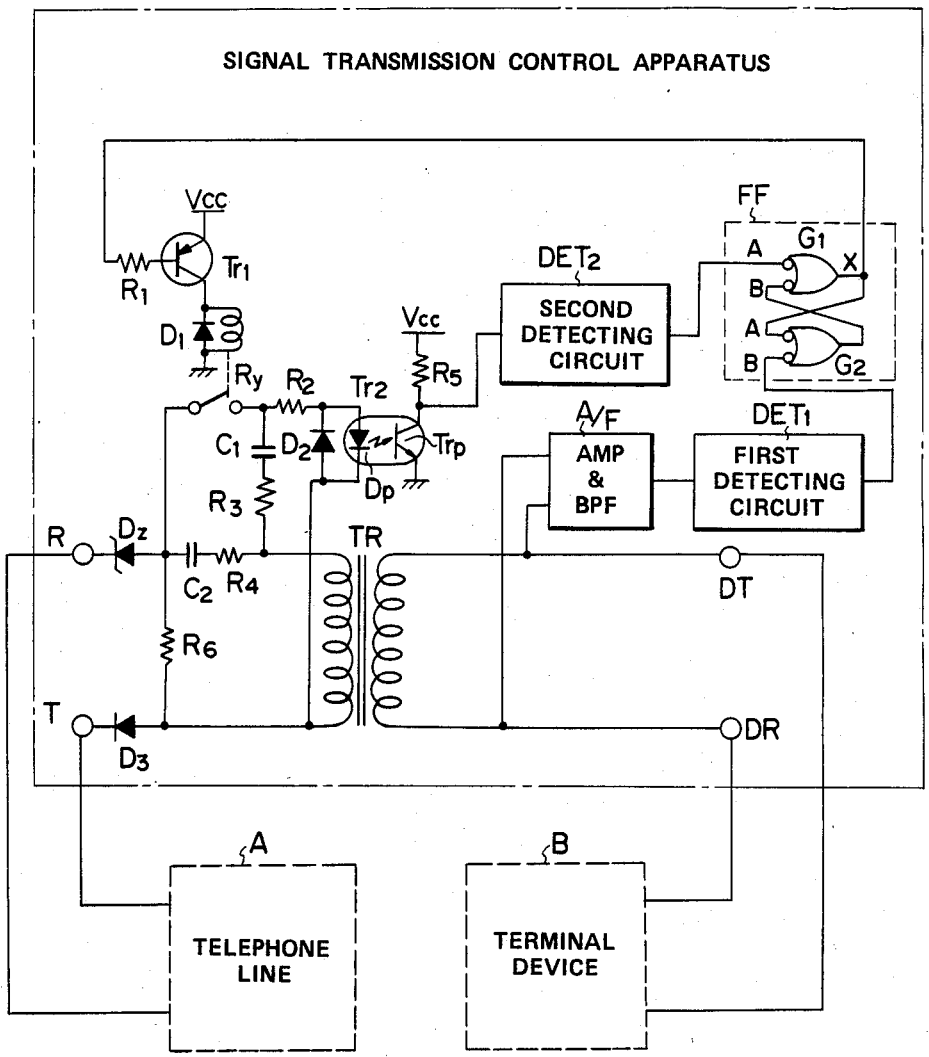
FIGS. 1 and 2 are circuit diagrams showing two different embodiments of this invention.

FIG. 1 is a circuit diagram showing a signal transmission control apparatus according to an embodiment of this invention. The signal transmission control apparatus is connected between a telephone line A and a terminal device B. In the figure, $R_1$ to $R_6$ are resistances; $C_1$, $C_2$ are condensers; $D_1$, $D_2$, $D_3$ are diodes; $D_z$ is a Zener diode; $Tr_1$ is a transistor; $Tr_2$ is a photocoupler; $D_p$ is a photodiode; $Tr_p$ is a phototransistor; Ry is a relay; and TR is a transformer whose primary coil is connected with the telephone line A through terminals T, R and at the same time whose secondary coil is connected with the terminal device B through terminals DT, DR. Further, A/F represents an amplifier and band pass filter; $DET_1$ and $DET_2$ are a first and a second signal detecting circuit, respectively; and FF is a flip-flop circuit. These are all easily realized according to well-known techniques.

In the construction described above, when no DC control voltage Vc exceeding the Zener voltage $V_z$ of the Zener diode $D_z$ ($V_c < V_z$) is supplied by the telephone line A, the signal transmission control apparatus is in the inactive state (idling state). In this case, since the impedance between the two terminals T and R of the transformer TR is very high, no signal transmission is performed between the telephone line A and the terminal device B.

In this state, the output level of the first and the second signal detecting circuits $DET_1$ and $DET_2$ is kept "H (high)" and the output level of the flip-flop circuit FF is kept also "H". On the other hand, the transistor $Tr_1$, the photocoupler $Tr_2$ and the relay Ry are all turned off, and thus the output level of the photocoupler $Tr_2$ is kept "H".

In order to call the signal transmission control apparatus, acting as an exclusive device in this state, a DC control voltage Vc exceeding the Zener voltage $V_z$ ($V_c > V_z$) is supplied from a control office through the telephone line A, and the Zener diode $D_z$ is turned on. This forms, in the signal transmission control apparatus, a DC conduction path $R \rightarrow D_z \rightarrow R_6 \rightarrow D_3 \rightarrow T$, i.e. a first DC circuit, and at the same time an AC conduction path $R \rightarrow D_z \rightarrow C_2 \rightarrow R_4 \rightarrow TR \rightarrow D_3 \rightarrow T$, i.e. a first AC circuit.

Then, when an AC calling signal $S_c$ superposed on the DC control voltage Vc is added through the telephone line A from the central office, not shown in the figure, this AC calling signal $S_c$ is outputted at the terminals of the secondary coil of the transformer TR and applied to the amplifier and band pass filter A/F. The amplifier and band pass filter A/F amplifies the applied signal $S_c$ and outputs only a signal in a predetermined band (including the frequency of the calling signal), which is applied to the first signal detecting circuit $DET_1$.

When the first signal detecting circuit $DET_1$ detects that the calling signal $S_c$ is included, it inverts its output level "H" up to that time and feeds a terminal B of a gate $G_2$ of the flip-flop circuit FF with an "L" level output. Thereby the flip-flop circuit FF inverts its output level "H" up to that time at the output terminal X and feeds the base of the transistor $Tr_1$ with an "L" level output through the resistance $R_1$.

The flip-flop circuit FF described above can be constructed e.g. by combining 2 negative logic 2-input NAND gates.

Thereby, since the transistor, which was off up to that time, is turned on, the relay $R_y$ is put in action and inverted from the off state up to that time to the on state so that the circuit is closed.

Thereby a new DC circuit $R \rightarrow D_z \rightarrow R_2 \rightarrow D_p \rightarrow D_3 \rightarrow T$ (the second DC circuit) and at the same time a new AC circuit $R \rightarrow D_z \rightarrow C_1 \rightarrow R_3 \rightarrow TR \rightarrow D_3 \rightarrow T$ (the second AC circuit) are formed. Therefore the output level of the photocoupler $Tr_2$ becomes "L". At this time, since the impedance consisting of the condenser $C_1$ and the resistance $R_3$ in the second AC circuit is sufficiently low with respect to the impedance of the transformer TR, AC signals coming either from the telephone line A or the terminal device B are transmitted to the opposite side through the transformer TR without attenuation. Consequently the signal transmission control apparatus is put in action and signal transmission is performed between the telephone line A and the terminal device B.

Further, by choosing a value for the resistance $R_2$ in the second DC circuit, which is very small with respect to that for the resistance $R_6(R_6 >> R_2)$, it is possible to make flow a greater DC current in the second DC circuit than in the first DC circuit. Therefore, in the central office, by detecting variations in intensity of the DC current flowing in the circuit, it can be verified that the signal transmission control apparatus is put in action and that signal transmission is being performed.

After the termination of a signal transmission, since the Zener diode $D_z$ is turned off by returning the level of the DC control voltage $V_c$ to the level $V_c < V_z$ from the central office through the telephone line, the constituting elements return to their original setting condition and the signal transmission apparatus is put in the inactive state.

That is, since the photodiode $D_p$ at the input side constituting the photocoupler $Tr_2$ is turned off by turning off the Zener diode $D_z$, the phototransistor $Tr_p$ at the output side is also turned off and its output level is inverted from the "L" level up to that time to the "H" level. The second signal detecting circuit $DET_2$ detects the variation in state and inverts the output level of the circuit from the "H" level up to that time to the "L" level, with which it feeds the other input terminal of the other gate $G_1$ of the flip-flop circuit FF. Thereby, since the output level of the flip-flop circuit FF is inverted from the "L" level up to that time to the "H" level, the transistor $Tr_1$ is turned off and the relay $R_y$ is also turned off. Consequently neither the second DC circuit nor the second AC circuit is formed and the signal transmission control apparatus is returned to the inactive state.

The second signal detecting circuit $DET_2$ described above can be made to act in the predetermined manner by constructing it using a differentiation circuit.

Figure 2:
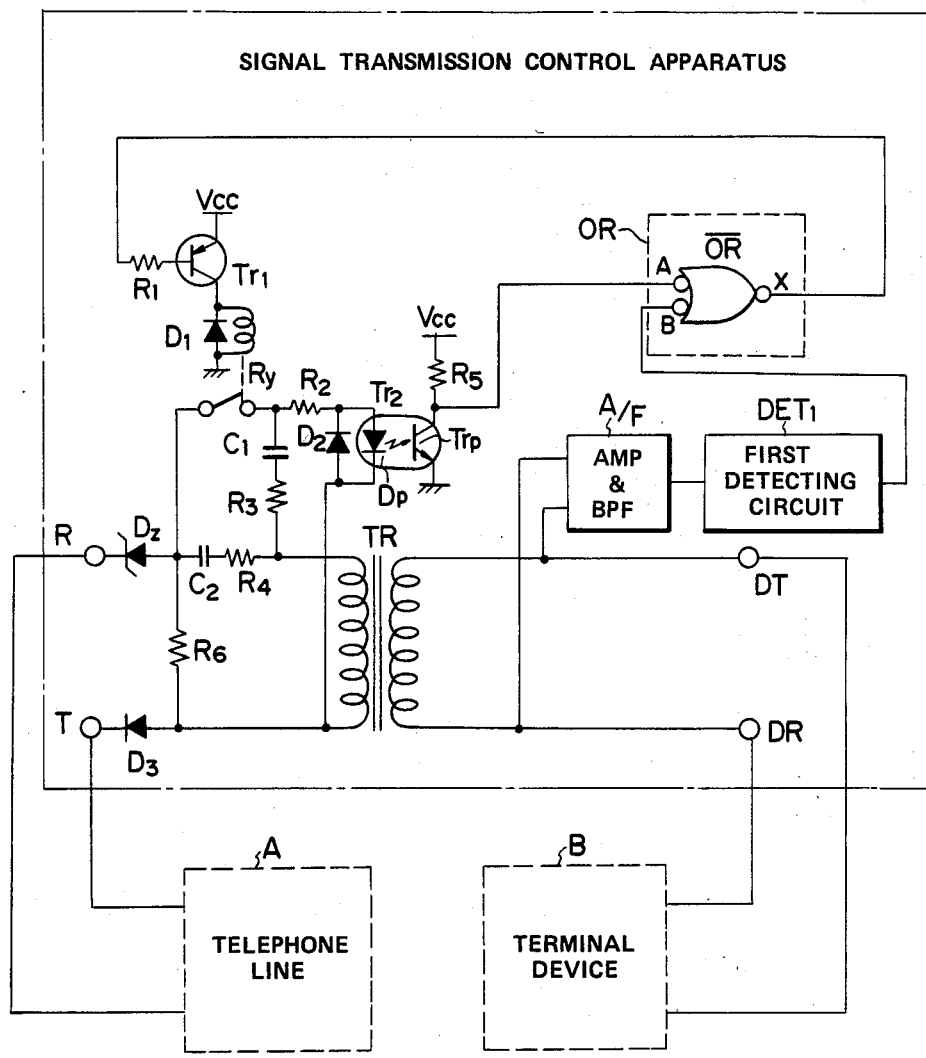

FIG. 2 is a circuit diagram illustrating another embodiment of this invention, where the corresponding members have the same reference numerals as those in FIG. 1. OR is an OR gate, which can be constructed e.g. with a negative logic ($\overline{OR}$). The OR gate circuit OR in this embodiment acts in the same manner as the sum of the second signal detecting circuit $DET_2$ and the flip-flop circuit FF.

In the construction described above, when no control voltage $V_c$ satisfying $V_c > V_z$ is supplied by the telephone line A, the output level of the signal detecting circuit $DET_1$ and that of the OR gate OR are kept "H". Further, the transistor $Tr_1$, the photocoupler $Tr_2$ and the relay are all turned off and the output level of the photocoupler $Tr_2$ is kept "H".

Consequently, the signal transmission control apparatus is in the inactive state.

Then, in this state, when a control voltage $V_c$ satisfying $V_c > V_z$ is supplied by the telephone line A and thereafter an AC calling signal $S_c$ is supplied, the output of the signal detecting circuit $DET_1$ is inverted from the high level "H" up to that time to the "L" level, which output is supplied to an input terminal B of the OR gate OR. Thereby, the output at the terminal X of the OR gate OR is inverted from the output level "H" up to that time to the "L" level, which is applied to the base of the transistor $TR_1$.

Thereby the second DC circuit and at the same time the second AC circuit are formed, as discussed previously, and thus the output level of the photocoupler $Tr_2$ becomes "L".

As the result, the signal transmission control apparatus is put in the active state.

In this embodiment, apart from the same works as those in the foregoing embodiment, even if the AC calling signal $S_c$ is removed in the active state of the signal transmission control apparatus, since an acting loop of output level "L" of the OR gate circuit OR→ transistor $Tr_1$ on→relay $R_y$ on→output level "L" of the photocoupler $Tr_2$ and output level "L" of the OR gate circuit OR can be formed, it is possible to keep the signal transmission control apparatus in the active state, as far as the control voltage $V_c$ satisfying $V_c > V_z$ is supplied.

After the termination of the signal transmission, the signal transmission control apparatus is put in the inactive state by returning the supplied DC control voltage $V_c$ to $V_c > V_z$. That is, by turning off the Zener Diode $D_z$. The photo diode $D_p$ at the input side of the photocoupler $Tr_2$ also is turned off and thus the phototransistor $Tr_p$ at the output side is also turned off. Consequently its output level is inverted from "L" up to that time to "H". Therefore, since the other input terminal A of the OR gate circuit OR is fed with the "H" level and the output level of the OR gate circuit OR is inverted from "L" up to that time to "H", the transistor $Tr_1$ is turned off and the relay $R_y$ is also turned off.

The concrete construction of the logic circuit, such as the flip-flop circuit, the OR gate circuit, etc. indicated in the embodiments mentioned above, can be arbitrarily selected or combined, as occasion demands.

As explained above, according to this invention, since the apparatus connected between a telephone line and a terminal device, which controls signal transmission therebetween comprises a transformer, whose primary and secondary coils are connected with the telephone line and the terminal device, respectively; a signal detecting circuit connected with the secondary coil of the transformer; first DC and AC circuits, which are formed depending on a control voltage from the telephone line connected with the primary coil of the transformer; second DC and AC circuits, which are connected to the primary coil of the transformer and formed depending on a calling signal from the telephone line; a relay connected with the second DC and AC circuits; a switching circuit, which turns the relay on/off; a photocoupler, which is connected with the second DC circuit; and a control means, which is connected to the photocoupler and controls the switching circuit depending on a signal from the detecting circuit, whereby, when the control voltage from the telephone line is supplied, the first DC and AC circuits are formed; in addition, when the calling signal is applied, the second DC and AC circuits are formed; and thus it is so constructed that signal transmission loss between the primary and secondary coils is sufficiently small, it is possible to control positively the signal transmission and in particular the apparatus can be applied efficaciously to no-ringing service.

I claim:

1. A signal transmission control apparatus connected between a pair of terminals of a telephone line and a pair of terminals of a terminal device for controlling mutual signal transmission therebetween upon receipt from said telephone line terminals of a control voltage and a calling signal, comprising:
- a transformer including primary and secondary coils, said primary coil having a pair of terminals connected with said telephone line terminals and said secondary coil having a pair of terminals connected with the terminal device terminals;
- a first signal detecting circuit means connected with the secondary coil terminals of said transformer for producing a detection signal in response to said calling signal from said telephone line;
- first DC and AC circuits connected to the terminals of the telephone line and the primary coil that become conductive upon receipt of said control voltage from the telephone line for effecting conduction between the primary coil of said transformer and said telephone line;
- second DC and AC circuits, that are connected to the primary coil of said transformer, said second DC and AC circuits being normally deactivated and being activated in response to said detection signal;
- a relay for activating said second DC and AC circuits in response to said detection signal;
- a switching circuit for activating said relay in response to said detection signal;
- means responsive to said second DC circuit for producing an indicator signal that said second DC circuit is activated; and
- a control means that energizes said switching circuit in response to said detection signal from said first signal detecting circuit and that maintains said switching means energized in response to said indicator signal.

2. A signal transmission control apparatus according to claim 1, wherein said first DC circuit consists of a Zener diode connected in series to said telephone line, a first resistance and a diode.

3. A signal transmission control apparatus according to claim 2, wherein said first AC circuit consists of a first condenser connected in series through the primary coil of said transformer to said telephone line, a second resistance, said Zener diode and said diode.

4. A signal transmission control apparatus according to claim 3, wherein said second DC circuit consists of a third resistance connected in series through the primary coil of said transformer to said telephone line and the relay, the photocoupler, said Zener diode and said diode.

5. A signal transmission control apparatus according to claim 4, wherein said second AC circuit consists of a second condenser, a fourth resistance, said Zener diode and said diode.

6. A signal transmission control apparatus according to claim 4, wherein said third resistance has a value smaller than that of the first resistance.

7. A signal transmission control apparatus according to claim 1, wherein said control voltage has a level higher than that of the Zener voltage of said Zener diode.

8. A signal transmission control apparatus according to claim 1, wherein said control means consists of a second signal detecting circuit connected to and receiving said indicator signal, and a flip-flop circuit connected between said second signal detecting circuit and said switching circuit.

9. A signal transmission control apparatus according to claim 1, wherein said control means consists of an OR gate circuit connected between said photocoupler and said switching circuit with said OR gate circuit receiving said indicator signal.

* * * * *